United States Patent [19]
Smith

[11] Patent Number: 5,467,595
[45] Date of Patent: Nov. 21, 1995

[54] VALVE MEANS

[75] Inventor: Wilfred W. Smith, Coventry, Great Britain

[73] Assignee: Dunlop Limited, United Kingdom

[21] Appl. No.: 196,210

[22] PCT Filed: Sep. 14, 1992

[86] PCT No.: PCT/GB92/01688

§ 371 Date: Mar. 11, 1994

§ 102(e) Date: Mar. 11, 1994

[87] PCT Pub. No.: WO93/05972

PCT Pub. Date: Apr. 1, 1993

[30] Foreign Application Priority Data

Sep. 13, 1991 [GB] United Kingdom ............... 9119544

[51] Int. Cl.⁶ .................................................. F16D 31/02
[52] U.S. Cl. .................. 60/410; 60/412; 60/453; 417/299; 280/711; 280/714
[58] Field of Search .................. 60/407, 409, 410, 60/412, 453, 468; 91/526, 531; 280/711, 714; 417/307, 299

[56] References Cited

U.S. PATENT DOCUMENTS 1,207,436  12/1916  Ohlsen ..................................... 417/299
4,504,081  3/1985  Shimizu et al. ........................ 280/711
4,659,104  4/1987  Kaltenthaler et al. .................. 280/714
4,717,117  1/1988  Cook .
4,756,548  7/1988  Tanaka et al. ........................... 280/714
4,881,753  11/1989  Shima et al. .
4,980,830  12/1990  Aoki et al. .

FOREIGN PATENT DOCUMENTS 0372218   6/1990   European Pat. Off. .
2554061   5/1985   France .
 801282  12/1950   Germany ................................ 417/299
1430557   4/1969   Germany .
3920165  12/1989   Germany .
57-167811 10/1982  Japan .
1218911   9/1989   Japan .

Primary Examiner—F. Daniel Lopez
Attorney, Agent, or Firm—Stevens, Davis, Miller & Mosher

[57] ABSTRACT

Valve system for a vehicle gas suspension system having a central chamber (41) to which pressurized gas is admitted via valve 50 or from which pressurized gas is exhausted via valve 51. Interposed in gas communication paths between the central chamber and each gas suspension unit (46–49) is a respective on-off valve unit (42–45). The valve system includes a regenerative drier (56) and a cushion valve (70) for protecting a compressor from overload during start-up.

12 Claims, 4 Drawing Sheets

VALVE MEANS

This invention relates to valve means and in particular, although not exclusively, to valve means adapted for controlling the supply of gas to and from gas springs of a vehicle suspension system.

The suspension system of an untracked wheeled vehicle typically comprises four gas suspension units disposed one proximate each respective corner of the vehicle and each suspension unit may have a gas chamber of selectively variable volume whereby the suspension height of the vehicle may be varied independently of load.

In a conventional arrangement two valves are associated with each suspension unit, one to permit exhaustion of gas from a suspension unit and the other to allow pressurised gas to be admitted to that suspension unit.

Whilst the aforedescribed configuration may be arranged to operate effectively, a considerable number of valve components are needed and this adds undesirably to the weight and complexity of the suspension control equipment.

The present invention seeks to provide an improved valve configuration for a vehicle gas suspension system.

In accordance with one aspect of the present invention valve means for a vehicle gas suspension system comprises a central chamber to which pressurised gas may be admitted and from which pressurised gas may be exhausted, gas communication paths for extending from said central chamber each to communicate with a respective gas suspension unit, interposed in each gas communication path a valve unit operable to lie either in a closed condition in which an associated gas spring is isolated from the central chamber or to lie in an open position in which the gas spring communicates with said central chamber, and said central chamber and said valve units being formed integrally as part of a valve manifold assembly.

One valve unit may be provided for selectively communicating the central chamber to atmosphere for exhausting pressure from one or more gas suspension units, or for putting the central chamber in communication with a supply of pressurised gas whereby one or more gas suspension units may be selectively pressurised.

As an alternative to providing a single additional valve unit for selective supply of pressurised gas to or from the central chamber, two additional valve units may be provided, one to facilitate supply of pressurised gas to the central chamber and the other for exhausting of pressurised gas.

The supply of pressurised gas may incorporate a drier to remove excess moisture, thereby to prevent undue condensation forming within the valve means and gas suspension units, and that drier may be arranged for operation regeneratively whereby gas exhausting from the central chamber is caused to pass through the drier to facilitate removal of moisture accumulated therein.

Each or at least some of the valve units may be of a pilot operated type. Alternatively all or some may be direct acting solenoids, e g valves known as "intelligent" solenoids and which work on the so-called hit and drop principle.

The valve manifold assembly additionally may incorporate or be interconnected with one or more additional valve units for flow of pressurised gas to or from the central chamber.

For a four wheel vehicle having four gas suspension units it will be understood that in contrast to the conventional provision of at least eight valve units, i e two per gas suspension unit respectively for supply and exhaust of pressurised gas, in accordance with the present invention the number of valve units is reduced to a minimum of five, i e four arranged each to communicate with a respective suspension unit and a fifth for supply of pressurised gas to or from the central chamber. Even if an additional valve unit is provided for separate supply and exhaust control there is still a most useful reduction in the number of valve units, i e six units in contrast to a conventional need for at least eight units.

A suitable type of valve unit is a diaphragm valve.

The valve means may incorporate one or more non-return valves arranged such that in the event of failure of the supply of pressurised gas from a supply unit, pressurised gas is retained within a gas suspension unit. Thus failure of the supply unit does not cause an unexpected loss of pressure in a suspension unit.

The valve means may incorporate a first common flow passage from an exhaust valve to a drier whereby gas exhausting through a first exhaust valve acts regeneratively to remove moisture from the drier. That common flow passage may serve in part as a supply passage to interconnect with a reservoir for storage of pressurised gas i e it acts commonly for supply and exhaust. A non-return valve may be provided in the first common flow passage at that part of the passage between the exhaust valve and part of the passage which serves also as a supply passage so as to prevent pressurised gas supplied to the reservoir acting on the outlet side of the exhaust valve. A non-return valve may be provided between the first common flow passage and reservoir whereby pressurised gas is prevented from venting from the reservoir via the flow passage when the flow passage is operational to allow gas to exhaust from the exhaust valve.

The valve means may incorporate a second common flow passage which extends between the drier and a compressor or like gas supply means for supply of pressurised gas. An exhaust passage may lead from that second flow passage and may incorporate a second exhaust valve to allow exhausting of air which is passed through the drier from the central chamber.

The second exhaust valve preferably is arranged to act as a cushion means whereby it is in an actual or potential exhaust condition during initial start-up of the compressor and such that the compressor does not start against a significant pressure differential.

In order that the second exhaust valve may act as a cushion means it may be a solenoid operated pilot type valve arranged such that upon or subsequent to energisation of the compressor the solenoid operates to close a pilot exhaust whereby the pilot chamber is exposed to pressure in the first common flow path. As pressure increases gradually in the first common flow path, notwithstanding that the main exhaust path through the second exhaust valve is open to exhaust, an increase in pressure in the pilot chamber may be arranged to close the main exhaust path. Said closure of the main exhaust path may be achieved by provision of a diaphragm type valve arranged with a greater surface area exposed to the pilot chamber pressure than that surface area of the other side of the diaphragm which is exposed to pressure created by the compressor. Preferably the diaphragm is exposed to pressure in the aforedescribed second common flow path and, at its other, pilot side, to pressure in the first common flow path whereby, with a drier interposed between said common flow paths, the increase of pressure in the pilot chamber will lag slightly behind that in the main exhaust path of the second exhaust valve.

Embodiments of the present invention will now be described, by way of example, with reference to the accompanying diagrammatic drawings in which.

Figure 1:
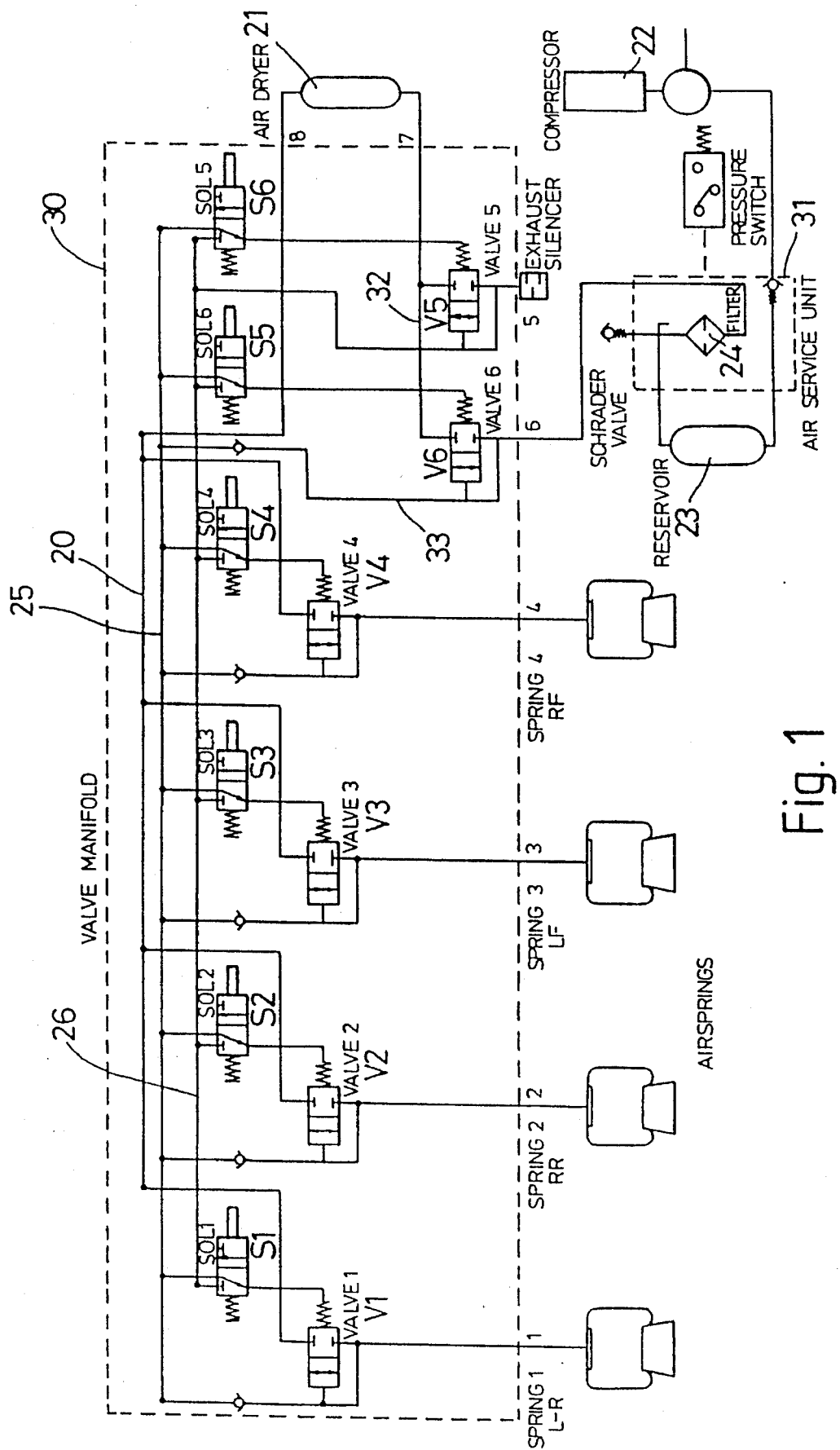
FIG. 1 shows schematically a pneumatic suspension for a four wheel vehicle and of a kind incorporating valve manifold means in accordance with one embodiment of the present invention.

The vehicle suspension incorporates four pneumatic springs (spring 1–spring 4) each having associated therewith a height sensor (not shown) which provides to an electronic control unit (not shown) a signal related to the extent to which the length of a respective air spring departs from a predetermined datum length.

The valve manifold comprises four valves (V1 to V4) each associated with a respective air spring and selectively controllable to allow pressurised air to be admitted to a spring or exhausted therefrom via a central manifold chamber 20. Operation of each valve V1 to V4 is effected by an associated electrically actuated solenoid valve (solenoids S1 to S4) which can be controlled to admit pilot air from a supply line 25 to a respective one of the valves V1 to V4 or exhaust pilot air via line 26.

The manifold also incorporates an exhaust valve V5 selectively operable to allow pressurised air to be exhausted from the main chamber 20 or pilot exhaust line 26.

The manifold further incorporates a supply valve V6 selectively operable to allow pressurised air from external supply 31 to pass through a passage 32 to an externally mounted air drier 21 and then to the main chamber 20. The supply of pressurised air to valve V6 also communicates with the pilot air pressure line 25 via passage 33.

The passage 32 also communicates with the exhaust valve V5 such that when pressurised air is to be exhausted from the main chamber 20 by closing valve V6 and opening valve V5, the pressurised air passes in a regenerative manner through the air drier 21 to remove accumulated moisture therefrom.

Operation of the electrical solenoid pilot valves is controlled by the electronic control unit.

The external supply 31 of pressurised air has associated therewith a compressor 22 which operates at intervals when the pressure in the reservoir 23 falls below a predetermined pressure. Air flows from the reservoir 23 via a filter 24 before entering the valve V6 or pilot air line 25.

Figure 2:
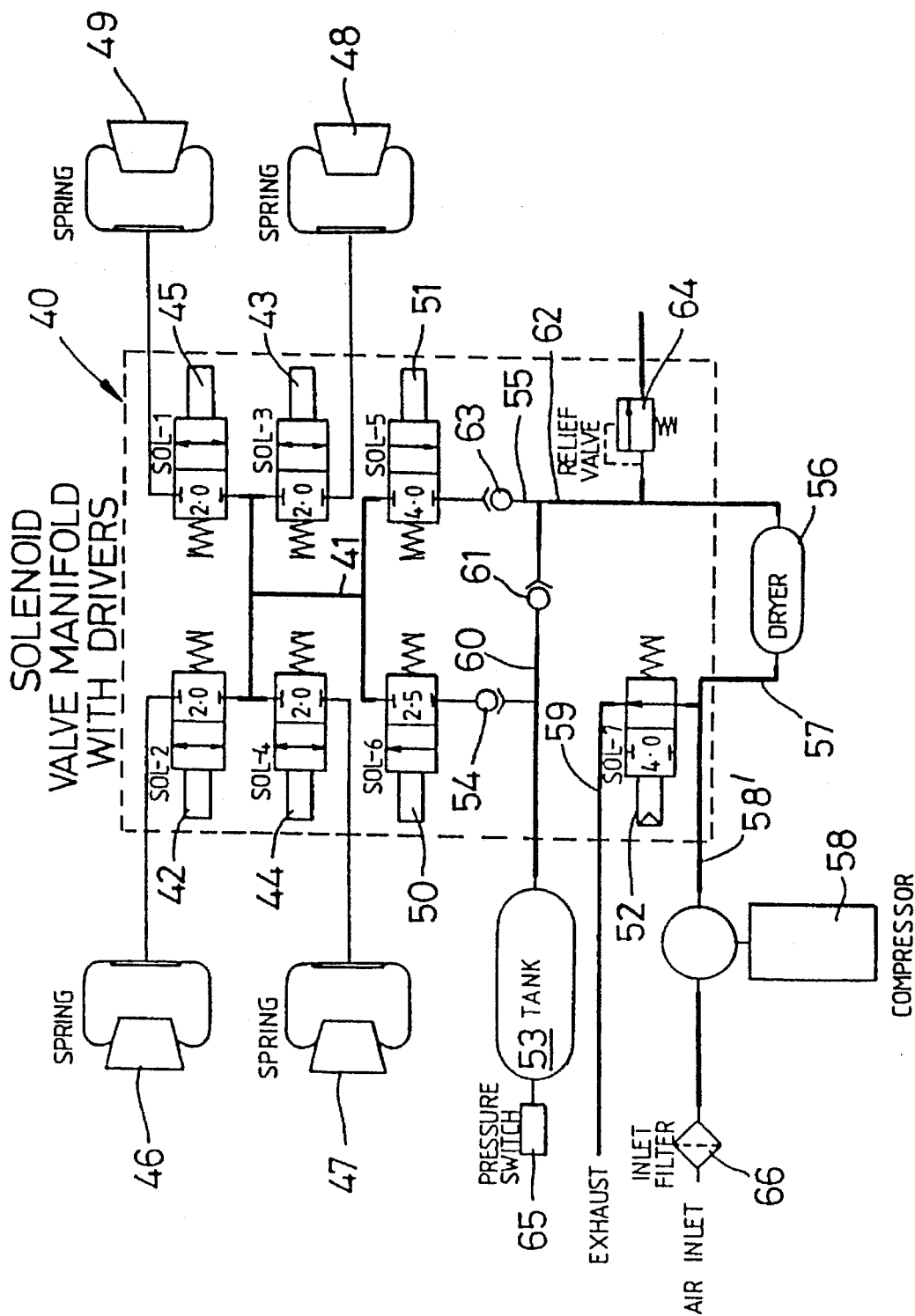
FIG. 2 shows schematically another pneumatic suspension in accordance with another embodiment of the present invention.

A second embodiment of the invention is shown in FIG. 2. The valve means of FIG. 2 comprises a valve manifold unit 40 having a central manifold chamber 41 and four direct-acting electrically operated solenoid valves 42–45 selectively controllable to allow pressurised air to be admitted to a respective air spring 46–49 or exhausted therefrom.

The manifold also incorporates three other electrically operated solenoid valves 50 . 52. One valve 50 is a supply valve to allow pressurised air to be admitted to the chamber 41 from an external reservoir 53 via a non-return valve 54. Another valve 51 is a first exhaust valve and interconnects with a second exhaust valve 52 via a first common flow path 55, an externally mounted regenerative drier 56 and a second common flow path 57.

An externally located compressor 58 connects via passage 58' with the second common flow path 57. The valve manifold also incorporates an exhaust passage 59 from the valve 52, an auxiliary supply passage 60 having a one-way valve 61 and interconnecting the reservoir 53 with a supply passage part 62 of the first common flow passage 55, and a non return valve 63 in that other part of the passage 55 between the supply part 62 and the first exhaust valve 51.

The valve means also incorporates other conventional items such as a safety relief valve 64, pressure switch 65 to initiate operation of the compressor 58 and air inlet filter 66.

In the aforedescribed apparatus the pressure in chamber 41 is controlled by operation of the valves 50,51 and is selected in accordance with the instantaneous requirements of a particular spring 46– 49 which is put in communication with the chamber via a respective valve 42–45.

When the reservoir pressure falls below a predetermined level and valves 51 and 52 are not in an exhaust mode the compressor 58 supplies filtered air to the reservoir 53 via the second common flow 57, drier 56, supply passage 62, non-return valve 61 and line 60.

When it is required to exhaust the chamber 41 any operation of the compressor is inhibited and the exhaust valves 51,52 are opened to allow air to flow via passage 55 and non-return valve 63 to pass regeneratively through drier 56 and then passage 57 and valve 52 to the exhaust line 59.

Figure 3:
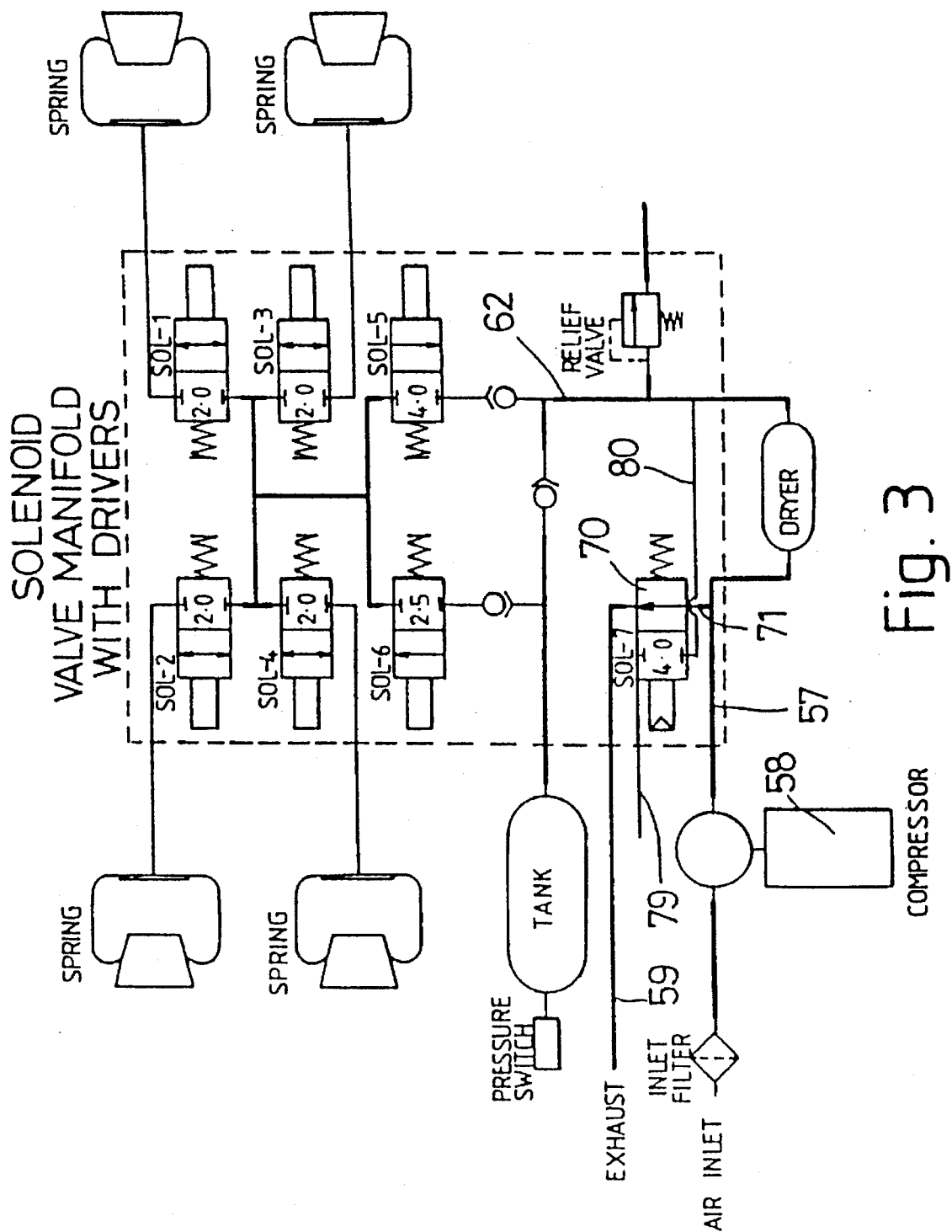
FIG. 3 shows a modified form of the embodiment of FIG. 2.
Figure 4:
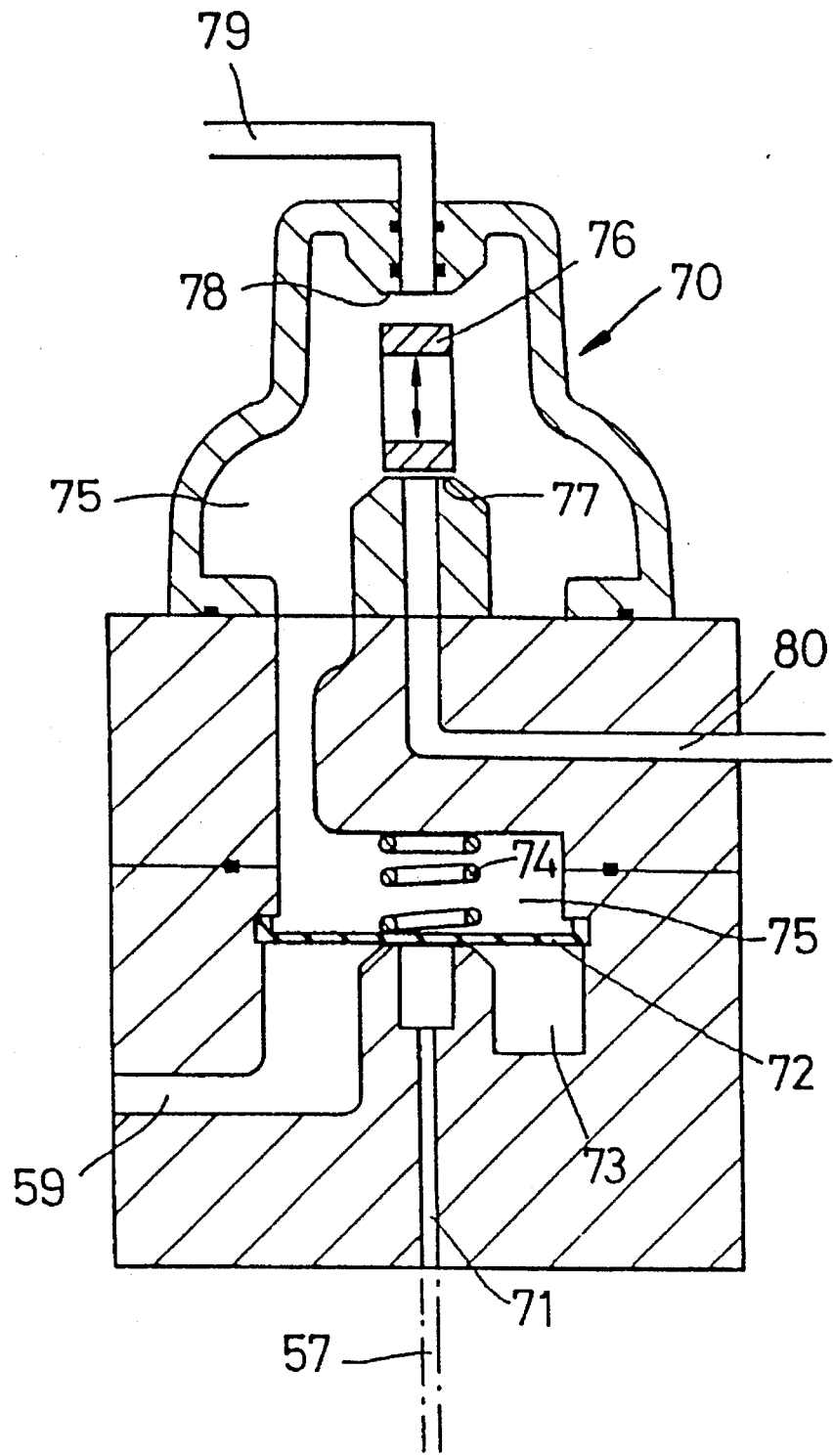
FIG. 4 is a cross-sectional view of a second, cushion exhaust valve of the suspension of FIG. 3.

The embodiment of FIG. 2 may be modified by replacing the second exhaust valve 52 with a pilot operated type valve 70 as shown schematically in FIG. 3, and as shown schematically in FIG. 3 and in cross-section in FIG. 4. Parts common with FIG. 2 bear corresponding reference numerals.

The valve 70 has a main exhaust path via passage 71, which leads from passage 57 and over a first face of a valve diaphragm 72 to an exhaust plenum 73 connected to the exhaust line 59.

The valve diaphragm 72 is biased closed against passage 71 by a compression spring 74 and its face opposite the first face is acted on also by pressure of gas in the pilot chamber 75. The pressure in the pilot chamber is under the control of an electrically actuated solenoid valve plunger 76. When plunger 76 is against a first valve seat 77 as shown in FIG. 4 the second valve seat 78 is open and a pilot exhaust line 79 results in the pilot chamber 75 being at atmospheric pressure. When the plunger 76 lies against the seat 78 the chamber is exposed to the pressure in the first common flow path 62 with which it interconnects via a pilot feed line 80.

In use of the valve of FIG. 4, as incorporated in the valve means of FIG. 3 in place of the second exhaust valve 52 of FIG. 2, during normal exhaust modes the plunger 76 is seated against seat 77 so that exhaust occurs only via the drier and passage 71, thereby obtaining regenerative drying of the drier by all of the exhausting gas. In this position chamber 75 is open to atmosphere and gas exhausting via passage 71 is able to counter the effect of bias spring 74 and thereby lift the diaphragm from the seat of passage 71.

In the case of the compressor being called upon to supply pressurised air to the reservoir the solenoid of valve plunger 76 is operated to lift the plunger from seat 77 to bear against seat 78, thus closing chamber 75 from the pilot exhaust line. The pressure in chamber 75 will thus be that in line 62 which is at or substantially equal to atmospheric pressure because of the presence of the reservoir's one-way valve 61 and the facility for line 62 to exhaust via passage 71 when the compressor is not operational. Hence on initial start up of the compressor 58 the pressure in line 57 is at or substantially equal to atmospheric pressure. The compressor is not required to suffer the strain and wear associated with start up against a significant pressure head.

Upon initial start up some gas will tend to exhaust via passage 71 against the bias of spring 74, but progressive increase of pressure in line 62 will act via line 80 and chamber 75 to cause the diaphragm 72 to be closed, it being noted that the area of diaphragm exposed to the pressure in chamber 75 is much greater than that area within the valve seat at the end of passage 71. Thus after a momentary initial start up period the line 71 is closed by action of the pressure built up in chamber 75 and the reservoir can be re-charged.

I claim:

1. Valve means for a vehicle gas suspension system, said valve means comprising a central chamber to which pressurized gas may be admitted and from which pressurized gas may be exhausted, gas communication paths for extending from said central chamber each to communicate with a respective gas suspension unit, and interposed in each gas communication path a valve unit operable to lie either in a closed condition in which an associated gas spring is isolated from the central chamber or to lie in an open position in which the gas spring communicates with said central chamber, the central chamber and the valve units being formed integrally as part of a valve manifold assembly, a first common flow passage from an exhaust valve to a drier which serves in part also as a supply passage for flow of gas from the drier to a reservoir, a second common flow passage which extends from the drier to a compressor means for supplying pressurized gas, an exhaust passage extending from said second common flow passage and incorporating a second exhaust valve arranged to allow exhausting of air which has passed through the drier from the central chamber, said second exhaust valve being a solenoid operated pilot type valve arranged to close a pilot exhaust line upon increase of pressure in the first common flow passage and to close a said exhaust passage which extends from the second common flow passage.

2. Valve means according to claim 1 comprising a further valve unit which acts as an exhaust valve for selectively communicating the central chamber to atmosphere for exhausting pressure from at least one gas suspension units and which acts as a supply valve for selectively putting the central chamber in communication with a supply of pressurized gas whereby at least one gas suspension unit may be selectively pressurized.

3. Valve means according to claim 2 in which said further valve unit comprises two discrete valve units, one a supply valve to facilitate supply of pressurized gas to the central chamber and the other an exhaust valve for exhausting of pressurized gas from the central chamber.

4. Valve means according to claim 2 wherein said further valve unit comprises a diaphragm type valve.

5. Valve means according to claim 1 in which at least some of the valve units are of a pilot operated type.

6. Valve means according to claim 1 in which at least some of the valve units are of a direct acting solenoid type.

7. Valve means according to claim 1 in which at least one of said valve units is a diaphragm type valve.

8. Valve means according to claim 1 which is arranged for communication with a supply of gas via a drier, said drier being arranged to receive gas exhausting from the central chamber whereby the exhausting gas tends to remove moisture accumulated within the drier.

9. Valve means according to claim 1 in which a non-return valve is provided in the first common flow passage at that part of the passage between the exhaust valve and part of the passage which serves also as a supply passage and is arranged to prevent pressurized gas for supply to the reservoir from acting on the outlet side of the exhaust valve.

10. Valve means according to claim 1 in which a non-return valve is provided between the first common flow passage and the reservoir whereby pressurized gas is prevented from venting from the reservoir via the flow passage.

11. A vehicle suspension comprising valve means according to claim 1 including gas supply means for the supply of pressurized gas to the valve means and vehicle gas suspension units to which gas may be supplied and from which gas may be exhausted via valve means.

12. Valve means for a vehicle gas suspension system, said valve means comprising a central chamber to which pressurized gas may be admitted and from which pressurized gas may be exhausted, gas communication paths for extending from said central chamber each to communicate with a respective gas suspension unit, and interposed in each gas communication path a valve unit operable to lie either in a closed condition in which an associated gas spring is isolated from the central chamber or to lie in an open position in which the gas spring communicates with said central chamber, the central chamber and the valve units being formed integrally as part of a valve manifold assembly, a first common flow passage from an exhaust valve to a drier which serves in part also as a supply passage for flow of gas from the drier to a reservoir, a second common flow passage which extends from the drier to a compressor means for supplying pressurized gas, an exhaust passage extending from said second common flow passage and incorporating a second exhaust valve arranged to allow exhausting of air which has passed through the drier from the central chamber, said second exhaust valve being a diaphragm type valve having a first side with an area which is exposed to pressure in the second common flow passage and a second side for which a greater area is exposed to pressure in the first common flow path in at least some operating conditions.

\* \* \* \* \*